United States Patent Office 3,368,656
Patented Feb. 13, 1968

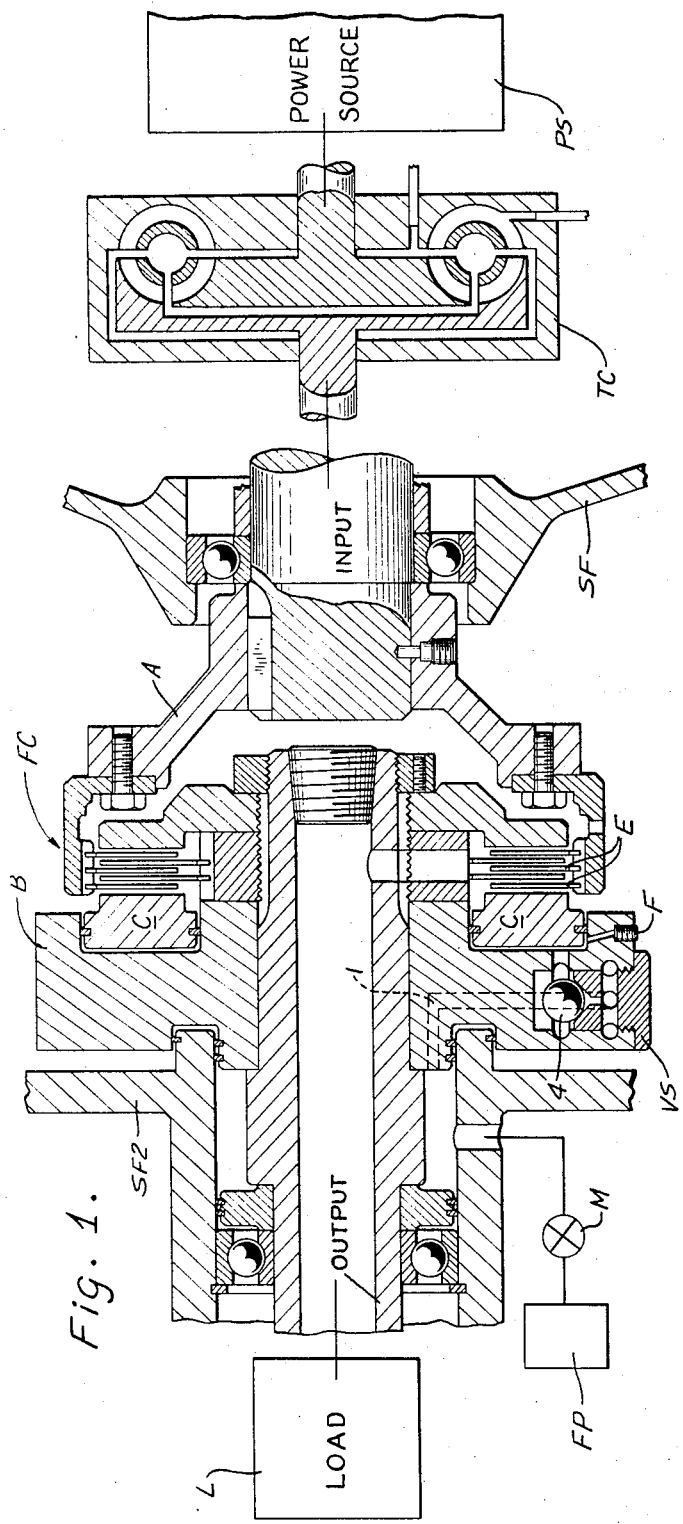
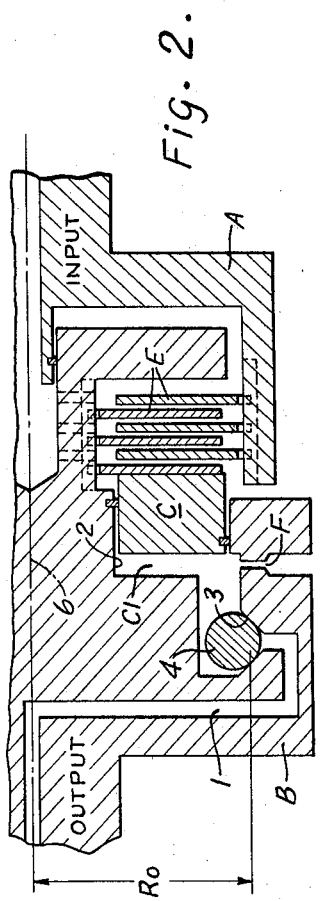

3,368,656
HYDRAULICALLY ACTUATED CLUTCH WITH CENTRIFUGAL BALL VALVE MEANS
Conrad R. Hilpert, Winnebago, Ill., assignor to Twin Disc, Incorporated, a corporation of Wisconsin
Filed May 5, 1966, Ser. No. 547,917
4 Claims. (Cl. 192—3.33)

This invention relates generally to a hydraulically actuated friction clutch having an improved centrifugally operated control ball valve means. The invention finds particular, though not exclusive, utility when used with a torque converter.

In conventional clutches of the hydraulically actuated type, pressure fluid is supplied to the hydraulic cylinder to actuate the piston. This fluid is introduced from near the centerline of the clutch, usually from rifle drilling in the center shaft, and is directed radially outwardly where it enters the expansible fluid chamber formed by the cylinder and piston. This forms a generally radially extending column of fluid which is subjected to centrifugal force and develops a considerable head acting on the piston, over and above any control pressure applied to the fluid. In order to compensate for or balance this centrifugal head of the column of fluid, balance pistons have been provided to work in opposition to the clutch actuating piston. These prior art balance pistons have taken various forms and as well as being expensive to manufacture and space consuming, they have other undesirable operating characteristics. For example, the output torque of a torque converter is zero at runout and maximum at stall. A conventional clutch having a torque capacity relatively constant with speed thus will engage with very high excess torque when its slip is greatest, exhibiting violence and high energy dissipation rates.

The clutch of this invention engages with decreased pressure when the slip is greatest, giving least violence and low energy dissipation rates and as the converter is pulled towards stall, the clutch capacity increases approximately following the converter output torque curve.

In accordance with the present invention, a hydraulically operated, modulatable friction clutch having an improved centrifugal ball valve is provided which eliminates the conventional balance piston and results in a smoothly and quickly operating clutch of economical design. Furthermore, the clutch is applied with increasing pressure as its speed decreases.

Another aspect of the invention provides a power transmission including a torque converter and a hydraulically operated modulating friction clutch having an improved centrifugally operated ball valve, which overcomes the prior art difficulties, provides the above desirable characteristics of the improved clutch, and results in a transmission wherein the clutch apply force can be made to coincide closely with the torque available, and inversely with the kinetic energy to be dissipated, automatically insuring operation of the transmission at optimum conditions.

The present invention provides a transmission which eliminates the need for conventional balance pistons; it will consume a decreasing amount of fluid as the rotational speed increases; it can apply increasing pressure as the speed decreases which is particularly desirable for a torque converter driven clutch; and it will apply the clutch rapidly and with a programmable and inherent force rise time.

A more specific aspect of the invention relates to a transmission of the above type in which the weight of the valve ball is greater than the centrifugal force due to the column of fluid to thereby produce particularly good operating characteristics.

These and other objects and advantages of the present invention will appear hereinafter as this disclosure progresses, reference being had to the accompanying drawings in which:

FIGURE 1 is a schematic diagram of a power transmission embodying the present invention;

FIGURE 2 is an enlarged, cross sectional view of a portion of the clutch shown in FIGURE 1;

Figure 3:
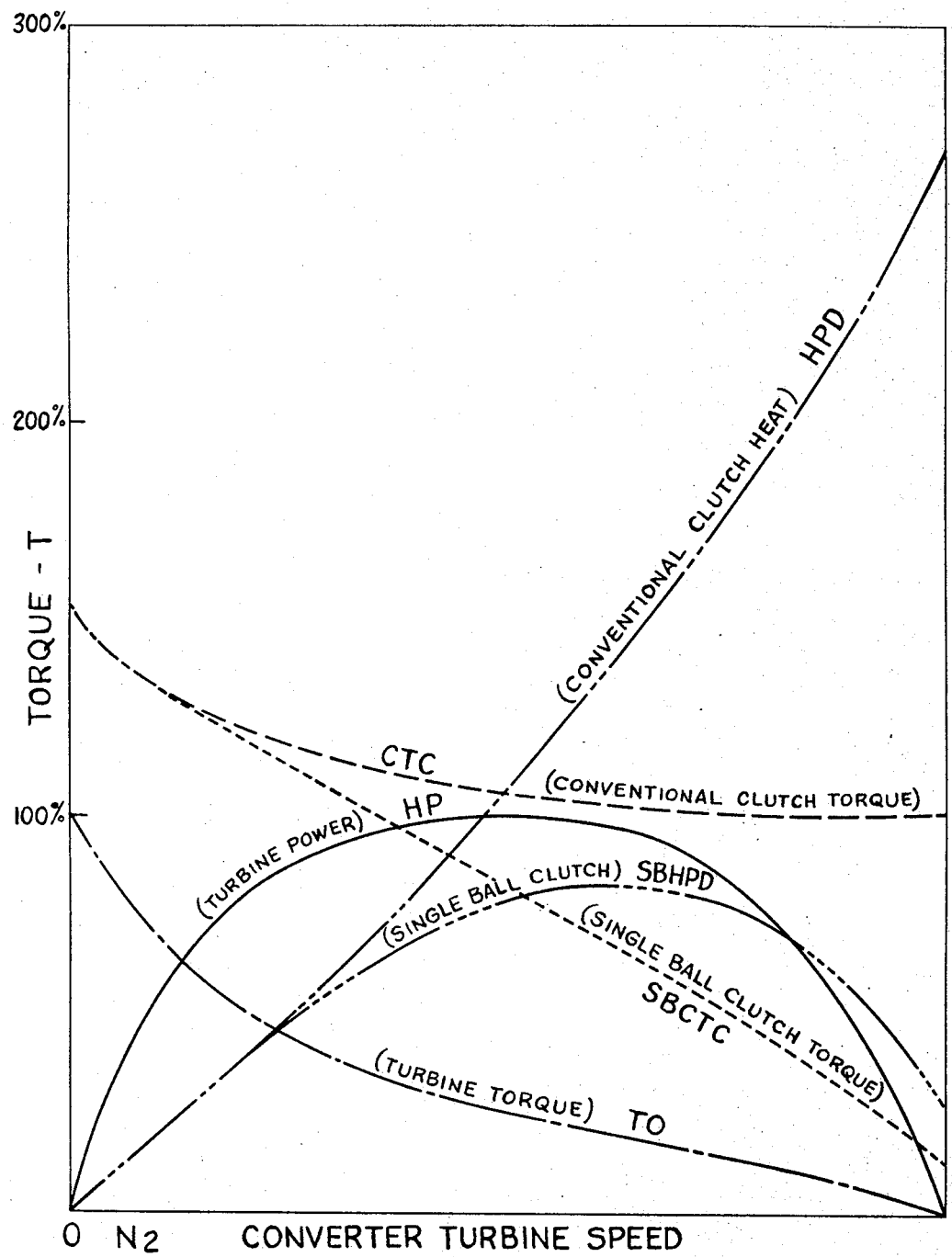
FIGURE 3 is a graph of characteristics of a conventional, balance piston, clutch as compared to a clutch made in accordance with the present invention.

The power transmission shown in FIGURE 1 includes a power source PS, such as an engine that drives a torque converter TC which in turn drives the input member A of the modulatable friction clutch FC. The output member B of the clutch is connected to any load L as desired.

The hydraulically actuated, modulatable friction clutch FC includes the interleaved plates E, some of which are secured to member A and others to member B in the known manner.

The hydraulically actuated means for causing actuation of the clutch includes a piston C which slides in the cylinder chamber C1 to form an expansible fluid chamber into which pressure fluid is introduced via passage means 1. A tapered valve seat 3 is located in the passage means, adjacent the piston, and a valve element in the form of a steel ball 4 is located in the passage means 1 on the downstream side of the seat 3. The centrifugally operated valve may be located in either the input or output member.

Pressure fluid in any adjustable amount is introduced into the passage means from an externally controllable source, such as a pump FP, and is controlled by an external valve as shown.

The effective column of fluid Ro is measured from the center line 6 of the clutch to the point of sealing of the ball on its seat. It is the centrifugal force acting on this column of fluid that creates a pressure which must be balanced by ball 4. As will appear, the ball is preferably made heavier than just that which would be necessary to balance the pressure due to centrifugal force of the fluid column. In this manner the actual control pressure imparted to the fluid is effective at all speeds to cause actuation of the clutch.

The clutch is of the modulatable type which can be slippingly engaged to any desired degree, depending on the amount of apply pressure exerted by the piston against the plates.

A bleed orifice F acts to continually bleed fluid from chamber C1 and will vent the chamber completely if the pressure fluid is shut off, thereby completely releasing the clutch.

The conventional torque converter drive is usually arranged so that when the converter is racing at zero torque, the clutch apply pressure in the clutch is equal to the control pressure when balance pistons are used, or equal to the control pressure plus centrifugal pressure if conventional dump valves are used. At the other extreme condition when the converter is stalled down at maximum torque or load; the clutch apply pressure is only that of the control pressure on the fluid.

Referring to the graph of FIGURE 3, where the torque T is plotted against the rotational speed N2 of the converter turbine member, the line TO indicates the torque output of the converter. The line HP indicates the horsepower output of the converter.

The line CTC of the graph indicates the clutch troque capacity of a conventional balance piston clutch, and line HPD indicates the horsepower dissipation of the conventional balance piston clutch.

The graph also shows these characteristics of a single ball valve clutch transmission made in accordance with the present invention, line SBCTC indicating the clutch torque capacity, and line SBHPD indicating the horsepower dissipation. It will be noted that the capacity of the clutch of the present invention is greatest at the lowest speeds, exactly where it is needed in a torque converter transmission, and diminishes at higher speeds. It will be noted that curve SBCTC approaches the horsepower curve HP of the converter. The horsepower dissipation of the improved clutch transmission also has very desirable characteristics as shown by line SBHPD, generally following the horsepower curve HP.

Various modes of carrying out the invention are contemplated as being within the scope of the following claims particularly pointing out and distinctly claiming the subject matter which is regarded as the invention:

1. A power transmission comprising, a torque converter; a hydraulically actuated, modulatable friction clutch driven by said converter; said clutch having a power input member driven by said converter, an output member connectable with a load, interleaved friction discs for variably connecting said members in drive transmitting relationship, hydraulically actuated means for actuating said clutch and including an expansible fluid chamber, passage means for introducing pressure fluid to said chamber; means for supplying fluid to said chamber; centrifugally operated ball valve means in said passage for balancing the centrifugal head due to fluid in said passage means, said ball valve means comprising, a valve seat in said passage means, a ball in said passage means and downstream of said seat and urged by centrifugal force into sealing relationship with said seat for blocking the flow of fluid to said chamber; and a bleed orifice from said chamber for controlled release of fluid therefrom.

2. The transmission as defined in claim 1 further characterized in that said ball is of such weight so as to exceed any unseating pressure due to centrifugal force of the effective oil column in said passage means.

3. A hydraulically actuated, modulatable friction clutch having a power input member, an output member connectable with a load, interleaved friction discs for variably connecting said members in drive transmitting relationship, hydraulically actuated means for actuating said clutch and including an expansible fluid chamber, passage means for introducing pressure fluid to said chamber; means for supplying fluid to said chamber; and centrifugally operated ball valve means in said passage for balancing the centrifugal head due to fluid in said passage means, said ball valve means comprising, a valve seat in said passage means, a ball in said passage means and downstream of said seat and urged by centrifugal force into sealing relationship with said seat for blocking the flow of fluid to said chamber; and a bleed orifice from said chamber for controlled release of fluid therefrom.

4. The clutch as defined in claim 3 further characterized in that said ball is of such weight so as to exceed any unseating pressure due to centrifugal force of the effective oil column in said passage means.

References Cited
UNITED STATES PATENTS

| 2,242,765 | 5/1941 | Stein. | |
|---|---|---|---|
| 2,297,480 | 9/1942 | Kratzmann. | |
| 2,935,169 | 5/1960 | Mills | 192—3.33 X |
| 3,094,203 | 6/1963 | Jania et al. | 192—106 X |

BENJAMIN W. WYCHE III, *Primary Examiner.*